(No Model.)

C. D. UPHAM.
GRAPPLING TONGS.

No. 309,898. Patented Dec. 30, 1884.

Witnesses:
Orra B. Moore.
Surry L. Edwards

Inventor:
Charles D. Upham,
By Thomas C. Orwig, Atty.

UNITED STATES PATENT OFFICE.

CHARLES D. UPHAM, OF COLFAX, IOWA.

GRAPPLING-TONGS.

SPECIFICATION forming part of Letters Patent No. 309,898, dated December 30, 1884.

Application filed June 17, 1884. (No model.)

*To all whom it may concern:*

Be it known that I, CHARLES D. UPHAM, of Colfax, in the county of Jasper and State of Iowa, have invented an Improved Grappling-Tongs, of which the following is a specification.

The object of my invention is to facilitate the lifting and moving of blocks of building-stone, kegs of nails, barrels of merchandise, &c.

Heretofore holes have been drilled in the opposite faces of blocks of marble and stone for the purpose of pivoting the gripping ends of tongs thereto and allowing the blocks to be turned and balanced in the tongs while being elevated or lowered by means of the tongs. Spurs have also been pivoted to the gripping ends of the arms of tongs, and elbow-shaped arms have been adjustably connected to adapt them to be spread or contracted as required to grapple objects differing in size.

My invention consists in the construction and combination of elbow-shaped arms and adjustable elbow-shaped legs carrying pivoted spurs, as hereinafter fully set forth.

Figure 1:
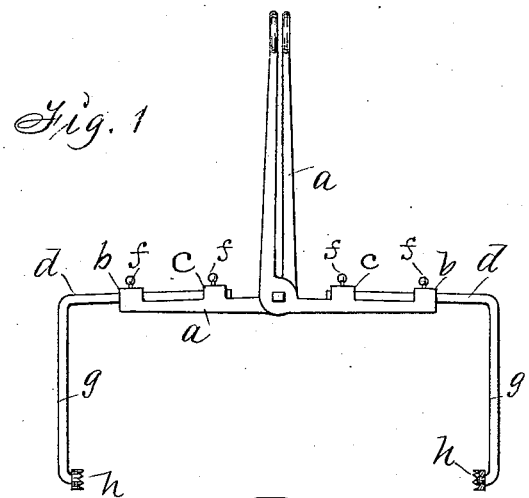
Figure 2:
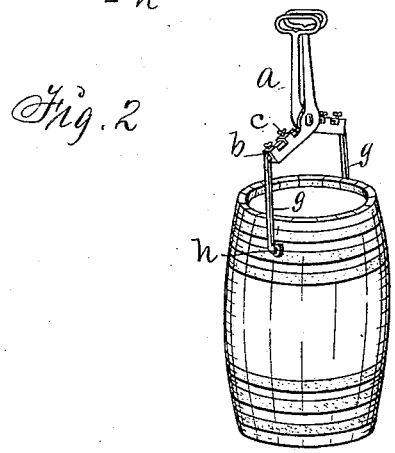
Figure 3:
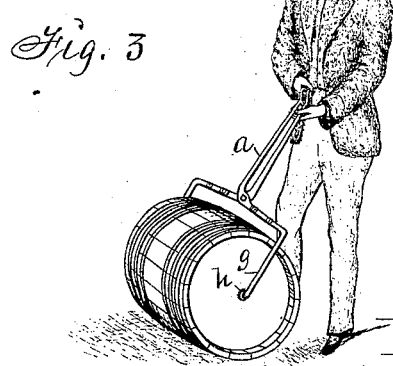

Figure 1 of my accompanying drawings is a side view of my improved tongs. Fig. 2 shows the tongs applied as required to lift and balance an open-ended barrel, a building-stone, or other object. Fig. 3 shows the tongs in position as required to roll a barrel. Jointly considered, these figures clearly illustrate the construction and operation of my complete invention.

*a a* represent two elbow-shaped arms, pivoted together in a common way. Each has an eye or loop, *b*, extending at right angles from its end, and a second loop, *c*, at a distance from the loop *b*.

*d d* are detachable legs adjustably connected with the arms *a* by simply inserting their upper ends in the loops *b c* and then fastening them by means of set-screws *f*, that extend into the loops *c*, or in any suitable way.

*g g* are jaws formed on the ends of the legs by simply bending their ends inward at right angles.

*h h* are revolving spurs secured to the jaws *g* by forming suitable bearings for them on the ends of the jaws and then placing the spurs thereon and riveting them fast, or in any suitable way, so that their points will project inward.

From the drawings and detailed description of the construction of my improved tongs the application and operation of the same in moving and elevating building-stones, barrels, &c., will be obvious, and specific instructions for using the same for the various purposes contemplated are deemed unnecessary.

I claim as my invention—

1. In a grappling-tongs, the combination of two elbow-shaped arms, *a*, having fixed loops *b c*, and two adjustable elbow-shaped legs, *d*, having fixed jaws *g*, substantially as and for the purposes stated.

2. The improved grappling-tongs composed of the pivoted elbow-shaped arms *a*, having loops *b c*, and the legs *d*, having jaws *g*, and revolving spurs *h*, substantially as shown and described, for the purposes specified.

CHARLES D. UPHAM.

Witnesses:
J. R. RYAN,
A. T. REEDER.